Patented June 12, 1951

2,556,868

UNITED STATES PATENT OFFICE 2,556,868

PREPARATION OF THREOPHENYLSERINOL

Herbert E. Carter, Urbana, Ill., and Edwin H. Flynn, Indianapolis, Ind., assignors to Eli Lilly and Company, Indianapolis, Ind., a corporation of Indiana No Drawing. Application July 13, 1949,
Serial No. 104,596

2 Claims. (Cl. 260—570.6)

This invention relates to novel organic compounds and to their preparation, and more particularly to threophenylserinol, its carboxyacyl derivatives and the methods of preparation thereof.

The novel compounds of this invention may be represented by the following general formula

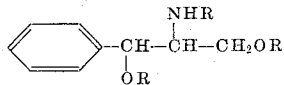

wherein R is hydrogen, in which case the compound is phenylserinol, or R is a carboxyacyl radical, for example, an acetyl, propionyl, benzoyl, phenylacetyl radical or the like, in which case the compound is triacetylphenylserinol, tripropionylphenylserinol, tribenzoylphenylserinol, triphenylacetylphenylserinol, or the like. In the above formula, the conventional method of indicating the threo configuration of the molecule has been employed.

The threophenylserinol of this invention is prepared by reducing an ester of threophenylserine with lithium aluminum hydride. In the reduction reaction the carboxyester group of the phenylserine is reduced to a carbinol (—CH$_2$OH) group. The threophenylserinol obtained by the reduction process can be isolated directly as such, or alternatively, can be isolated in the form of a carboxyacyl derivative, the derivative being prepared by treating the relatively crude phenylserinol obtained from the reaction, with an acylating agent. The acylated threophenylserinol thus obtained, is converted to threophenylserinol by known hydrolytic methods. If desired, the acylated phenylserinol can also be obtained by acylation of purified phenylserinol. As illustrated by the above formula, the acyl derivatives of threophenylserinol, obtained by the above methods, are triacyl derivatives, both of the hydroxy groups and the amine group of the phenylserinol molecule being acylated.

The esters of phenylserine useful for the purposes of this invention are obtained by the esterification of threophenylserine. A suitable esterification method comprises the reaction of phenylserine with an alcohol in the presence of a substantially anhydrous acid, for example hydrogen chloride gas. Other methods known to the art for the preparation of esters can be employed.

As will be understood by those skilled in the organic chemical art, numerous esters of phenylserine are suitable for the purposes of this invention, but because of their ease of preparation and availability the lower alkyl esters of phenylserine are preferred.

The compounds of this invention have utility as intermediates in the preparation of synthetic organic chemical compounds. For example, the compounds are useful in the synthesis of antibiotic agents of the class of chloramphenicol. Antibiotic agents of this type possess two asymmetric carbon atoms and are, therefore, capable of existing in stereoisomeric forms. Chloramphenicol is characterized by the presence of the threo configuration of its molecule rather than the erythro configuration, and hence the intermediates used in the preparation of chloramphenicol, which form an integral part of the stereoisomeric portion of the molecule, must possess the threo form of the molecule. Surprisingly and in contrast to commonly used reductive methods, the reductive method of this invention for the preparation of phenylserinol does not give rise to an appreciable inversion of either of the asymmetric carbon atoms, so that reduction yields substantially only threophenylserinol or its carboxyacyl derivative. The present invention thus constitutes a ready means of obtaining phenylserinol of the proper spacial configuration, for as is already known, threophenylserine from which the esters used in this invention are obtained, is readily separated from a mixture of threo- and erythrophenylserine. In sharp contrast thereto, mixtures of threo- and erythrophenylserinol are intractable, and suitable methods for the isolation of threophenylserinol from such mixtures are not available.

The following examples further illustrate this invention.

Example 1

The methyl ester of threophenylserine is prepared by suspending 10 g. of threophenylserine in 250 ml. of absolute methanol and passing dry hydrogen chloride gas into the mixture until the solution is nearly saturated. During the addition of the hydrogen chloride gas the temperature rises to about 60° C. The mixture is allowed to stand at room temperature for about 12 hours and is then concentrated in vacuo nearly to dryness whereupon the hydrochloride salt of threophenylserine methyl ester crystallizes. The crystalline mixture is allowed to stand for about 15 hours in vacuo over aqueous potassium hydroxide to cause further drying of the crystals and to remove excess hydrogen chloride. The crystalline residue of the hydrochloride of threophenylserine methyl ester is dissolved in about 50 ml. of absolute methanol and 350 ml. of ether are added slowly whereupon the hydrochloride of phenylserine methyl ester crystallizes in lustrous plates. The crystals are washed with ether and dried in vacuo over phosphorous pentoxide. So obtained, the crystals of threophenylserine methyl ester hydrochloride melt at about 161–162° C.

The hydrochloride of threophenylserine methyl ester is converted to the free ester by adding 10.4 g. of the hydrochloride to an excess of a saturated aqueous solution of sodium bicarbonate layered with 75 ml. of ether. The ether containing the threophenylserine methyl ester is separated and the aqueous layer is extracted with three 50 ml. portions of ether to remove the threophenylserine methyl ester remaining in the aqueous layer. The ether extracts are combined, are dried over anhydrous magnesium sulfate and concentrated to dryness in vacuo whereupon the threophenylserine methyl ester is obtained in the form of a syrup.

The threophenylserine methyl ester is converted to tribenzoyl threophenylserinol in the following manner: 8.82 g. of freshly prepared threophenylserine methyl ester are dissolved in 125 ml. of anhydrous ether and the solution is added dropwise with rapid stirring over a period of one half hour to about 550 ml. of a dry ethereal solution containing 4.5 g. of lithium aluminum hydride. The stirring is continued for about one half hour and 15 ml. of water are added slowly and cautiously to decompose excess lithium aluminum hydride and the lithium-aluminum derivative of the threophenylserinol formed in the reaction. A solution of 400 ml. of water containing 60 g. of sodium hydroxide is added and the mixture is stirred rapidly for 2 hours. The ether layer is separated and discarded and the aqueous layer washed with about 300 ml. of ether and the ether discarded. The threophenylserinol in aqueous solution is converted to its tribenzoyl derivative by adding 25 ml. of benzoyl chloride in small portions with shaking and cooling. The tribenzoyl derivative of threophenylserinol separates as a solid. The solution is centrifuged and the residue comprising tribenzoylthreophenylserinol and aluminum salts as impurities, is triturated with dilute hydrochloric acid and centrifuged. The trituration process is repeated, and the residue comprising the tribenzoyl derivative, substantially free from aluminum salts, is purified by dissolving it in 850 ml. of boiling 95 percent ethanol and 200 ml. of water, allowing the solution to stand at room temperature for about 6 hours and filtering off the crystalline tribenzoylthreophenylserinol which separates. The crystalline tribenzoylthreophenylserinol is further purified by recrystallization from 800 ml. of boiling ethanol, and as thus obtained melts at about 180–182° C.

Threophenylserinol is obtained from its tribenzoyl derivative as follows: 5 g. of tribenzoylthreophenylserinol are added to a solution of 200 ml. of concentrated hydrochloric acid, 50 ml. of ethanol and 100 ml. of glacial acetic acid. The mixture is refluxed for about 18 hours at which time all of the tribenzoylthreophenylserinol is hydrolyzed. The solution containing the threophenylserinol is concentrated in vacuo to a small volume and the residue is diluted with about 50 ml. of water and extracted with two 50 ml. portions of ether to remove the benzoic acid formed during the hydrolysis. The aqueous layer containing the threophenylserinol in the form of its hydrochloride salt is concentrated in vacuo to a syrupy consistency, 1.5 g. of potassium carbonate in 10 ml. of water are added to liberate the free base of threophenylserinol. The aqueous solution is extracted with two 25 ml. portions of ethyl acetate and the extracts are combined and evaporated, leaving a residue of threophenylserinol. The threophenylserinol is purified by recrystallization from a mixture of ethyl acetate and petroleum ether. The threophenylserinol thus obtained melts at about 88–91° C.

*Example 2*

Threophenylserine ethyl ester is prepared from threophenylserine, ethanol and hydrogen chloride according to the procedure described in Example 1.

56 g. of threophenylserine ethyl ester are added in small portions to a vigorously stirred solution of 27 g. of lithium aluminum hydride in 1500 ml. of absolute ether. The mixture is stirred for about 2 hours and 75 ml. of water are added slowly and cautiously to decompose excess lithium aluminum hydride and the lithium derivative of the threophenylserinol formed in the reaction. The reaction mixture which contains a solid consisting of lithium and aluminum bases mixed with phenylserinol and water is filtered and the ether discarded. The solid precipitate is stirred with one liter of methanol and the solution is saturated with carbon dioxide gas to cause precipitation of the inorganic constituents. The precipitate is extracted twice with hot methanol and the methanol extracts are combined with the methanol filtrate and evaporated in vacuo to a syrup. The syrup is dissolved in a small amount of water, is filtered to remove a small amount of solid impurities, and the filtrate is evaporated to a syrupy residue. The residue containing the threophenylserinol is extracted with three one-liter portions of hot benzene, the extracts are combined and treated with 10 g. of decolorizing carbon and filtered, and evaporated to dryness in vacuo. The residue consisting of threophenylserinol is a syrup which slowly crystallizes. After the threophenylserinol has crystallized it is purified by recrystallization from a mixture of ethyl acetate and petroleum ether, and as thus purified melts at about 84–85° C.

*Example 3*

14 g. of threophenylserinol are dissolved in 150 ml. of dry pyridine, and 200 ml. of acetic anhydride are added. The mixture is allowed to stand at room temperature for about 22 hours, during which time the triacetyl derivative of threophenylserinol is formed. The reaction mixture is then evaporated in vacuo, leaving a residue of triacetylthreophenylserinol. The residue is dissolved in chloroform, the chloroform is washed successively with dilute hydrochloric acid, sodium bicarbonate solution, and water, and the chloroform solution is dried over anhydrous sodium sulfate. The chloroform is evaporated and the residue of triacetylthreophenylserinol is distilled in vacuo. It boiled at 185–195° C. at a pressure of 0.2 mm. of mercury. The distillate, comprising substantially pure triacetylthreophenylserinol, crystallized on standing. It is further purified by recrystallization from a mixture of ethyl acetate and petroleum ether, whereupon it melts at about 84.5–85.5° C.

We claim:

1. A process of preparing threophenylserinol which comprises treating a threophenylserine ester with lithium aluminum hydride.

2. A process of preparing threophenylserinol which comprises reacting an ethereal solution of a threophenylserine ester with an ethereal solution of lithium aluminum hydride, treating the reaction mixture with water, and recovering the threophenylserinol.

HERBERT E. CARTER.
EDWIN H. FLYNN.

REFERENCES CITED

The following references are of record in the file of this patent:

UNITED STATES PATENTS

| Number | Name | Date |
|---|---|---|
| 2,103,266 | Lott | Dec. 28, 1937 |
| 2,483,884 | Crooks et al. | Oct. 4, 1949 |
| 2,483,885 | Crooks et al. | Oct. 4, 1949 |

OTHER REFERENCES

Ovakimian et al., "J. Biol. Chem.," vol. 135 (1940), pp. 91 to 98.